United States Patent [19]

Williams et al.

[11] Patent Number: 4,608,596
[45] Date of Patent: Aug. 26, 1986

[54] SYSTEM FOR COLORIZING VIDEO WITH BOTH PSEUDO-COLORS AND SELECTED COLORS

[75] Inventors: Lance Williams, Westbury; Jules Bloomenthal, Glen Cove, both of N.Y.

[73] Assignee: New York Institute of Technology, Old Westbury, N.Y.

[21] Appl. No.: 530,656

[22] Filed: Sep. 9, 1983

[51] Int. Cl.[4] .................... H04N 1/46; H04N 9/43; H04N 9/74

[52] U.S. Cl. .................................... 358/81; 358/75; 358/78

[58] Field of Search .............. 358/81, 82, 22, 80, 358/75, 78

[56] References Cited

U.S. PATENT DOCUMENTS

| | | | |
|---|---|---|---|
| 3,706,841 | 12/1972 | Novak | 358/82 |
| 3,710,011 | 1/1973 | Altemus et al. | 358/82 |
| 3,761,607 | 9/1973 | Hanseman | 358/81 |
| 3,784,736 | 1/1974 | Novak | 358/81 |
| 3,943,561 | 3/1976 | Biddlecomb | 358/81 |
| 3,972,067 | 7/1976 | Peters | 358/81 |
| 3,975,762 | 8/1976 | Van den Bosch | 358/81 |
| 4,025,946 | 5/1977 | Casey | 358/81 |
| 4,149,185 | 4/1979 | Weinger | 358/81 |
| 4,189,743 | 2/1980 | Schure et al. | 358/75 |
| 4,189,744 | 2/1980 | Stern | 358/75 |
| 4,258,385 | 3/1981 | Greenberg et al. | 358/22 |
| 4,270,141 | 5/1981 | Sakamoto | 358/78 |

Primary Examiner—James J. Groody
Assistant Examiner—Randall S. Svihla
Attorney, Agent, or Firm—Martin Novack

[57] ABSTRACT

A system is disclosed for forming frames of color video signals. A video color encoder and a multichannel keyer are employed in generating color frames from monochrome frames. Colors from a pseudo-color generator can be automatically inserted in portions of a frame that are not being colorized by an operator with operator-selected colors.

11 Claims, 4 Drawing Figures

SYSTEM FOR COLORIZING VIDEO WITH BOTH PSEUDO-COLORS AND SELECTED COLORS

BACKGROUND OF THE INVENTION

This invention relates to video systems and, more particularly, to a system for colorizing monochrome video frames.

There are a number of different types of existing equipment for colorizing monochrome video. One use of such equipment is for producing colorized versions of existing monochrome film. In one type of system the film is viewed with a video camera to obtain an electronic video signal which can then be stored and processed electronically to add colors to specified regions of each frame. Some electronic colorizing systems involve the use of so-called "pseudocolorizers", which operate, in the manner of an electronic look-up table, to assign a particular color to the luminance value that is sensed at each elemental position or pixel of a monochrome frame. Systems also exist in which an operator can specify, such as via a computer terminal, particular colors that are to be assigned to specified regions of a frame being colorized. These systems generally tend to be complex and expensive, although most such systems do not provide the operator with adequate flexibility while performing the colorization tasks.

The cost of colorizing is directly related to the time that it takes to color each frame, so it would be highly advantageous to have a system that was itself not unduly expensive, and also facilitated the rapid production of colorized video frames.

The following U.S. patents disclose techniques for colorization of monochrome pictures, or related techniques: U.S. Pat. Nos. 3,706,841, 3,710,011, 3,761,607, 3,784,736, 3,943,561, 3,975,762, 3,972,067, 4,025,946 and 4,149,185.

The prior art systems known to applicant suffer from one or more of the following disadvantages: (1) slow processing speed, with each frame to be colorized requiring many minutes or hours, resulting in unduly high processing costs; (2) lack of operator convenience and flexibility that is needed to facilitate obtainment of quality colorized video; (3) undue complexity and/or cost of the colorizing system itself.

It is an object of the present invention to overcome these disadvantages of prior art video colorizing systems.

SUMMARY OF THE INVENTION

The present invention is directed to an improved system for colorization of monochrome video frames under operator control, the system facilitating colorization at relatively high speed while not requiring unduly expensive components. In accordance with an embodiment of the invention, means are provided for deriving a monochrome video signal representative of a video frame. Means are provided for generating operator-selected color component signals for operator-selected regions of pixels of a video frame. A color video frame memory is provided for storing the operator-selected color component signals for each pixel selected by the operator for colorization. A video color encoder is provided, the encoder having a luminance input and a plurality of color component inputs, and an encoded color video output. The monochrome video signal is coupled to the luminance input of the encoder and the color component signals scanned out of the color video frame memory are coupled to the respective color component inputs of the encoder. Means are provided for recording the output of the encoder, and for displaying the output of the encoder.

As described in the preferred embodiments hereof, the operator typically works at a data tablet, while viewing the frame to be colorized, and defines and/or selects regions of the frame to be colorized, and also selects the colors to be used in each region. This color information is stored in the frame buffer portion of the recited color video frame memory. Preferably, in addition to being able to view the composite work on a display coupled to the output of the encoder, the operator can also see the colors being added to the frame on a display, for example an RGB monitor, coupled to the output of the color video frame memory.

In an embodiment hereof, a pseudo-colorizer is used to generate a pseudo-colorized frame from the original monochrome video frame, and this is used as an initial rough colorization from which an operator can begin working toward the ultimately desired colorization of the frame. In this embodiment, a monochrome video frame buffer is provided for storing the monochrome video signal, and a pseudo-color look-up memory is responsive to the outputs of the monochrome frame buffer for generating a plurality of pseudo-color component signals. Typically, and as known in the art, these pseudo-colors are a function of the amplitude of the luminance signal at each pixel of the frame to be colorized. In the embodiment hereof, a multi-channel keyer is utilized to select either the pseudo-colored component signals or, preferentially, the operator-selected color-component signals (when present) for coupling to the color-component inputs of the encoder. Also, in this embodiment, an auxiliary buffer is provided for keying a cursor output, at RGB resolution, to the RGB monitor. Also, an operator-controlled switcher allows viewing by the operator, on the RGB monitor, of the pseudo-colored frame or the operator-selected colored portions of the frame.

Further features and advantages of the invention will become more readily apparent from the following detailed description when taken in conjunction with the accompanying drawings.

DESCRIPTION OF THE PREFERRED EMBODIMENT

Figure 1:
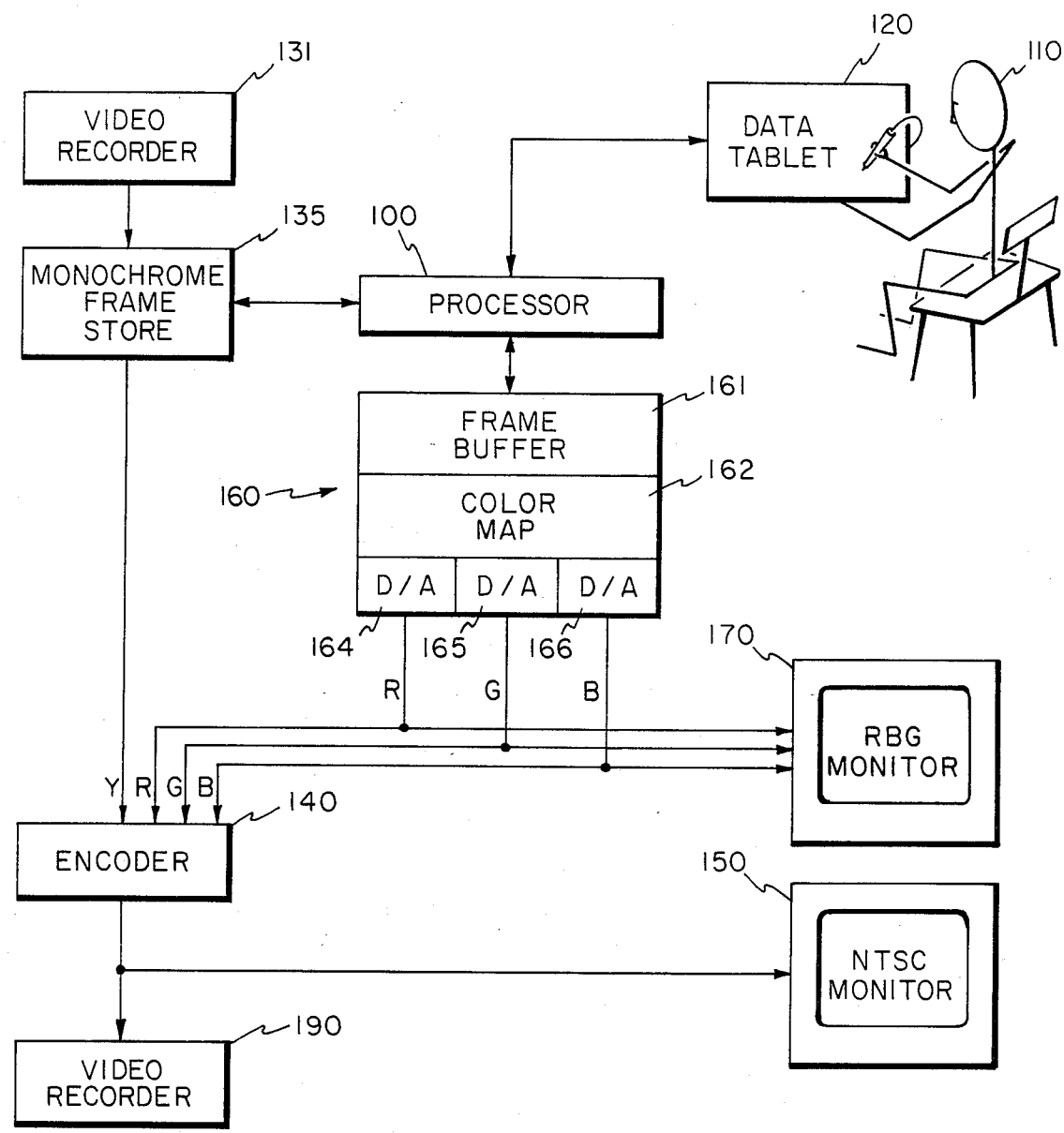
FIG. 1 is a block diagram of a system in accordance with an embodiment of the invention.

Referring to FIG. 1, there is shown an embodiment of an apparatus in accordance with the invention. A source of monochrome image is provided. In the illustrated example, the source is a monochrome frame store 135 which is coupled to a video recorder 131. It will be understood that any suitable source of monochrome video can be employed. The output of frame store 135, which may include a frame grabber and a digital-to-analog converter, is coupled to the luminance input of a color video encoder 140 which, in the present embodiment, is a standard RBGY NTSC encoder which receives a luminance input, Y, and color component inputs, R, G, and B, and produces an output signal in standard NTSC format; i.e. a video signal containing luminance and chrominance signals in a form suitable for display using a conventional NTSC monitor. The encoder 140 may comprise, for example, an RGBY NTSC encoder of the type sold by Bosch Fernseh Co. The output of encoder 140 is coupled to NTSC monitor 150 and to another video recorder 160.

In the present embodiment, an operator 110 utilizes a data tablet 120 to select regions of a frame to be colorized. The coordinates of the operator-selected regions to be colorized, as well as the color value representations, are input to processor 100 which, in this embodiment, is a general purpose digital processor, such as a Sun processor manufactured by Sun Microsystems of Mountain View, Calif. The particular manner in which the regions are defined by the operator and color values therefor are selected are not, per se, the subject of the present invention. Reference can be made, for example, to U.S. Pat. No. 4,189,743, which is incorporated herein by reference, for disclosure of a system and routine for defining operator-selected regions and operator-selected colors for the regions. The referenced patent also discloses techniques for automatically generating in-between frames of colorized video. Also, if desired, the contours of the monochrome video can be coupled to processor 100 and used to automatically generate operator-selectable patterns in accordance with the technique and routines set forth in the U.S. Pat. No. 4,189,744, which is also incorporated herein by reference. It will be understood that additional computing and/or memory capability can be provided for implementing such known automatic features.

The processor 100 is also coupled to a color video frame memory 160 which conventionally includes a digital frame buffer 161, a color map 162, and digital-to-analog converters 164, 165 and 166 for the R, B, and G color outputs. These, and other frame memory component units, may be, for example, of the type made by Datacube, Inc., of Peabody, Mass. The frame buffer is capable of storing 768 by 512 color pixels, with 8 bits of R, B, and G information at each pixel position of a video frame to be colorized. When an operator selects a region of pixels for colorization, in accordance with the technique described in U.S. Pat. No. 4,189,743, each pixel in the region is assigned appropriate R, B and G digital values representative of the operator-selected color. The contents of the color frame memory 160 can be routinely scanned, in synchronism with monochrome frame store 135, under control of processor 100, to obtain R, G and B values (if present) at each pixel scanned in the video field pattern. The R, G and B outputs of frame memory 160 are respectively coupled to the R, G and B inputs of encoder 140 and also to an RGB monitor 170 which displays the color pixel values currently in the color frame memory 160.

In operation, of the FIG. 1 embodiment, the frame stored in monochrome frame store 135 is initially displayed on the NTSC monitor 150 as a monochrome image. The operator defines and/or selects regions of the image using the data tablet 120 and also selects, for input to the processor 100, the color values to be assigned to the selected regions. These color values are stored at the pixel positions within the defined region in the memory 160, and the colored regions are shown on the RGB monitor 170. Also, the components comprising the selected colors are coupled to encoder 140, in conjunction with the luminance value Y from the stored monochrome image, so that the "colorized" regions appear, superimposed on the monochrome image, on the NTSC monitor 150. In this manner, an entire image can be colorized, viewed, and stored, such as on video recorder 190 or other suitable storage means. Also, it will be understood that when key frames are colorized, in-between frames can be automatically colorized using a technique such as that disclosed in the above referenced U.S. Pat. No. 4,189,743.

Figure 2:
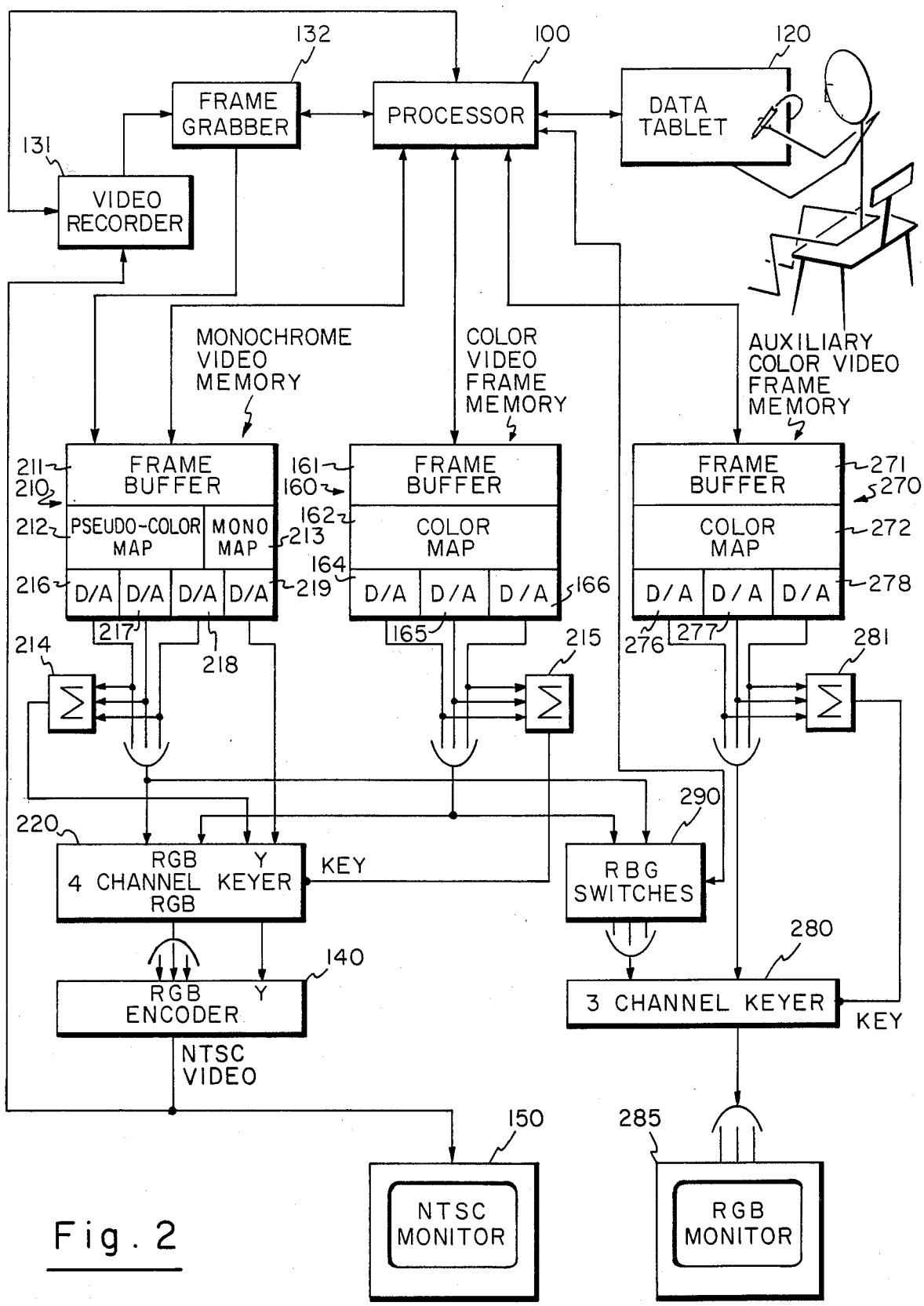
FIG. 2 is a block diagram of a system in accordance with another embodiment of the invention.

Referring to FIG. 2, there is shown a further embodiment of the invention which includes certain automatic features which facilitate operation. As will become understood, in operation of the FIG. 2 embodiment, a pseudo-colorizer is used to obtain a "first pass" at colorization of the frame, and operator-controlled colorization is implemented for selected regions of the frame in which the pseudo-colorization is deemed inadequate. In this embodiment, the output of frame grabber 132 is coupled to a monochrome video memory 210 which includes a monochrome frame buffer 211 which drives pseudo-color map 212 and monochrome map 213, and digital to analog converters 216, 217, 218 and 219 respectively for the R, B and G outputs of the pseudo color map and the Y output of the monochrome map. The outputs of pseudo-color map 212 provide R, B and G signals to R channel, B channel and G channel inputs of a four channel keyer 220. These R, B and G ouputs are also summed by a summer 214 whose output is coupled to a Y channel input of the keyer 220.

The outputs of color video frame memory 160, which is as described in the FIG. 1 embodiment, are R, G and B signal inputs to the other R channel, G channel, and B channel, inputs of four channel keyer 220. These R, G and B signals are also summed by summer 215, the output of which is used to key all channels of the keyer 220. The output of the monochrome map 213, associated with the monochrome video memory 210, is coupled to the other Y channel input of the keyer 220.

Figure 3:
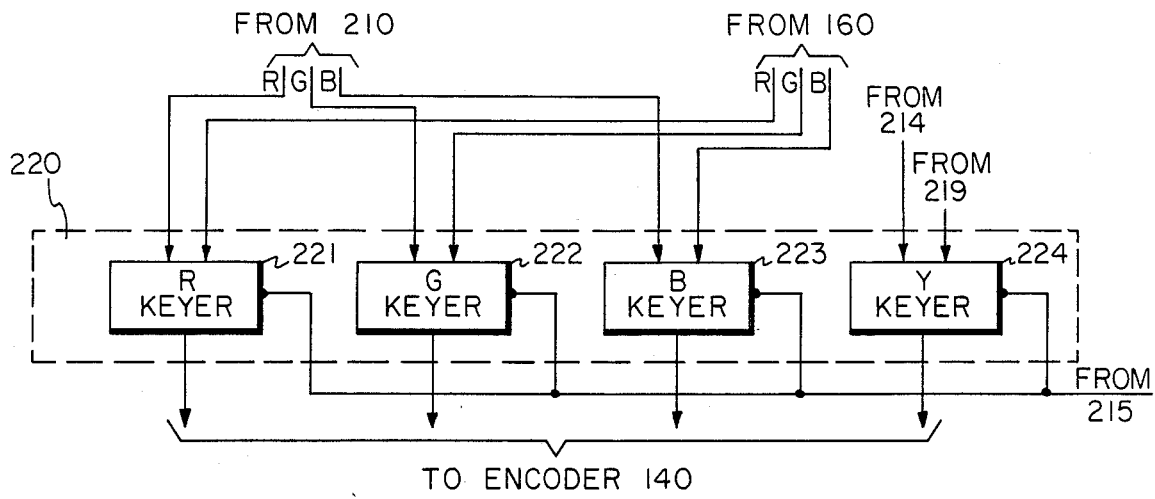
FIG. 3 is a block diagram of the multi-channel keyer utilized in the FIG. 2 embodiment.

The four-channel keying subsystem 220 used in the FIG. 2 embodiment is shown in FIG. 3 and includes four keying circuits 221, 222, 223 and 224, i.e., one for each of the R, G and B color component signals, and one for the luminance component signal, Y. As noted above, the keying signal applied to each of the keyers 221, 222, 223, and 224, is the output of a summer 215 which sums the color output signals from the color video frame memory 160. Since the frame buffer of color memory 160 is originally loaded with all zeros for each color at each pixel position, the summer 215 will have an output only during scanning of pixels within regions for which the operator has selected colors. In such instance, the keying signal will be "on", and this will cause each of the keying circuits 221, 222, 223 and 224 to select, for passage to the inputs of RBGY encoder 140, the respective scanned color outputs of color video memory 160, and the luminance from monochrome map 213.

During scanning of pixels which are not in regions in which the operator has selected colors, i.e. when the keying signal output of summer 215 is "off", the keying circuits 221, 222, and 223 select the respective color component signals output from pseudo-color map 212 associated with the monochrome video memory 210. Also, when the keying signal is "off", the luminance keying circuit 224 selects the derived luminance output from summer 214 as its luminance output for passage to the luminance input of encoder 140.

The output of encoder 140 is displayed on NTSC monitor 150 and can be recorded, under operator control, on video recorder 131. In the embodiment of FIG. 2, the video recorder 131 is the same one on which the source monochrome video is recorded, although it will be understood that a further recording means of any desired type can be utilized. The video displayed on the monitor 150 can be seen to consist of the pseudo-colorized frame derived from the monochrome frame being processed, but "overridden" as to colorization in all regions where the operator has selected colors and stored them in the color video frame memory 160.

In the embodiment of FIG. 2 an auxiliary color video frame memory 270 comprising frame buffer 271, associated color map 272, and digital to analog converters 276, 277 and 278, is provided for the cursor that can be used by the operator, inter alia, to specify pixel positions and regions of a frame, consistent with the teachings of the above-referenced U.S. Pat. No. 4,189,743. A cursor signal, which may specify, for example, the position of the data pen associated with data tablet 120, is conventionally output from processor 100 and stored in the color frame memory 270. As is known in the art, the cursor can be of any desired color and configuration. The cursor color video signal components output from the memory 270 are respectively coupled to color component inputs of the color keyer circuits of three channel keyer 280. The three channel keyer 280 can be of the same type of construction as the previously described four channel keyer 220, except that it does not include a luminance keyer circuit. The color component outputs of the auxiliary memory 270 are also summed by summer 281 to derive a keying signal used to key the keying circuits of three channel keyer 280. The other color component inputs to the respective color keying circuits of three channel keyer 280 are the R, G and B outputs of three two channel RGB switcher 290. The switcher 290, which includes a semiconductor switch for each color component, receives the RBG outputs of color video memory 160 and the RGB outputs of pseudo-color map 212. It selects one of these as its output, under operator control, via processor 100. Thus, to facilitate the colorization operation, the operator can select, for viewing on RGB monitor 285, either the output of the pseudo-color map 212 or the output of the color map 162 associated with the color memory 160. As noted, the three color component signals output from switcher 290 are coupled to the second inputs of the respective color keying circuits of three channel keyer 280. Except for those pixels at which the cursor is present (and which will result in a keying control signal output from summer 281) the three channel keyer 280 selects the output of switcher 290 for display on the RGB monitor 285. In this manner, the operator can readily select, via switcher 290, which of the color video sources is to be presented on the RGB monitor 285. The color video frame being formed can, of course, also be viewed on the NTSC monitor 150.

Figure 4:
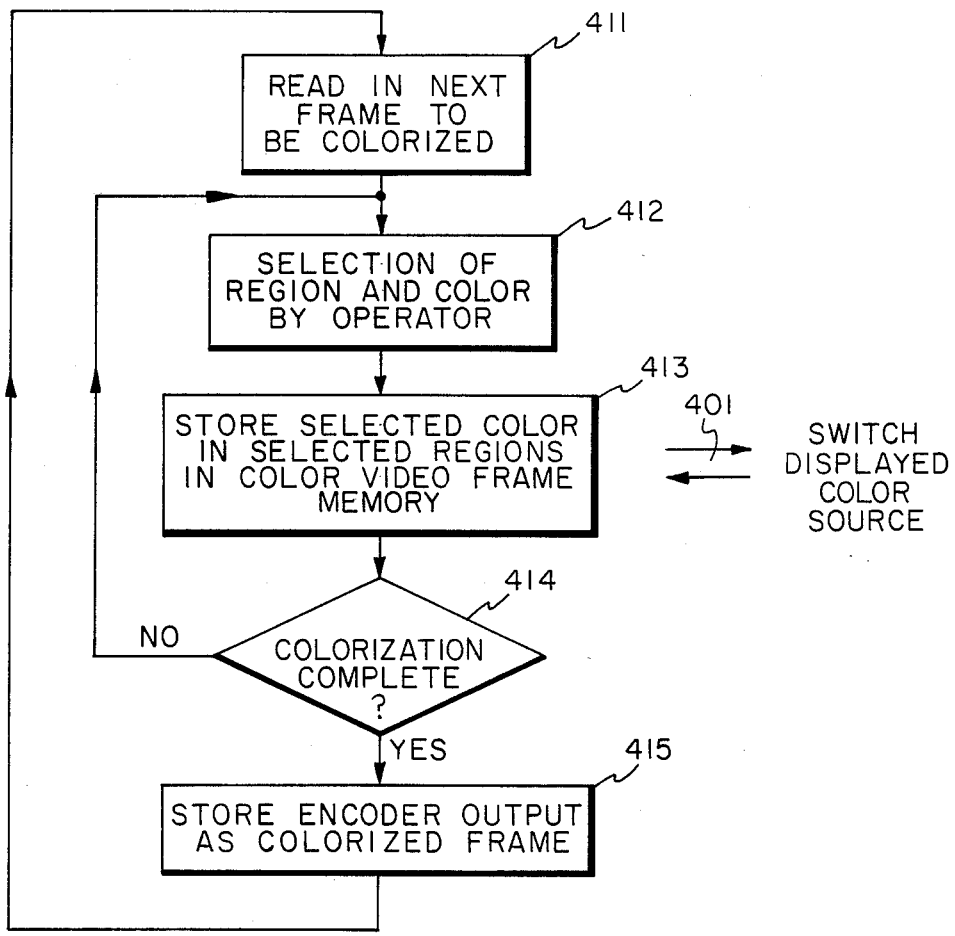
FIG. 4 is a flow diagram of the routine of the processor of the FIG. 2 embodiment.

FIG. 4 shows the routine of the processor 100 for controlling the system of FIG. 2, the routine also having application to the FIG. 1 system. It will be understood that the processor will routinely control functions common to video systems, including the synchronized scanning of the memories, monitors, video recorders, etc., and the generation of the cursor signals. In addition to inputs from the data tablet 120, the processor may conventionally receive other inputs common to a control terminal, such as a keyboard (not shown).

In the routine of FIG. 4, in response to operator controls, a monochrome frame to be colorized is read in. This function is represented by the block 411 and, in the FIG. 2 embodiment, represents the control over the reading of a monochrome frame into frame grabber 132 and then into monochrome video memory 210. The block 412 represents the selection by the operator of a region of the frame for colorization and the selection of a color for the region. These values may be generated, for example, in accordance with the teachings set forth in the above-referenced U.S. Pat. No. 4,189,743. The block 413 represents the storage of the selected color values in the color video frame memory 160, the colors being selected by the operator for regions that are also defined by the operator. As indicated by the arrows 401, the operator can control switcher 290 to determine which of the color sources is displayed on RGB monitor 285. (The NTSC monitor 150 will continously display the frame as compiled to the current time.) If colorization is not complete (decision diamond 414), block 412 is reentered and further regions of the frame are colorized. When complete, block 415 is entered, this block representing the control of the video recorder 131 to store the encoder output, when a frame has been fully colorized (or at any other desired time). The next frame can then be colorized.

The invention has been described with reference to particular embodiments, but variations within the spirit and scope of the invention will occur to those skilled in the art. For example, while the invention has been described in the context of NTSC system television, it will be understood that it has application in other television systems as well. Also, as noted herein, prior art techniques, including those of the patents incorporated by reference above, can be used to advantage for generating in-between frames or for obtaining initial colorized versions of some frames in which the techniques hereof are then used to provide further colorization. Further, it will be recognized that any suitable mode of operator input control can be employed, consistent with the principles of the invention.

We claim:

1. A system for forming frames of color video signals, comprising:
    means for deriving a monochrome video signal representative of a video frame;
    a monochrome video frame buffer for storing said monochrome video signal;
    a pseudo-color look-up memory responsive to the output of said monochrome video frame for generating a plurality of pseudo-color component signals;
    means for deriving a luminance signal from the output of said monochrome video frame buffer;
    means for generating operator-selected color component signals for operator-selected regions of pixels of a video frame;
    a color video frame memory for storing said operator-selected color component signals for each pixel in the regions selected by the operator for colorization;
    a video color encoder having a luminance input and a plurality of color component inputs, and an encoded color video output;

means responsive to color component signals output from said color video frame memory for generating a keying control signal;

a multichannel keying means, under control of said keying control signal, for receiving said pseudo-color component signals and the operator-selected color component signals and for selecting for coupling to the color component inputs of said video color encoder either said pseudo-color component signals or said operator-selected color component signals;

means for applying said luminance signal to the luminance input of said encoder; and means for recording the output of said encoder.

2. The system as defined by claim 1, further comprising color display means for displaying the output of said encoder.

3. The system as defined by claim 2, wherein said means for deriving a luminance signal comprises means for generating a first luminance signal from an output of the monochrome video frame buffer and further comprises means for generating a second luminance signal from said plurality of pseudo-color component signals, and wherein said multichannel keying means is also operative, under control of said keying control signal, to couple either said first luminance signal or said second luminance signal to the luminance input of said encoder.

4. The system as defined by claim 2, further comprising a second color display means, and means for selecting, under operator control, either said pseudo-color color component signals or said operator-selected color component signals for display on said second color display means.

5. The system as defined by claim 4, further comprising means for deriving a cursor signal; an auxiliary video memory for storing said cursor signal; and further keying means responsive to said stored cursor signal for coupling said stored cursor signal to said second color display means to the exclusion of other signals when said cursor signal is present.

6. The system as defined by claim 5, wherein said color video frame memory includes a digital frame store.

7. The system as defined by claim 5, wherein said encoder is an RGBY encoder having red, green, blue and luminance inputs.

8. The system as defined by claim 7, wherein said encoder is an NTSC encoder having as its output an NTSC encoded signal.

9. The system as defined by claim 2, wherein said color video frame memory includes a digital frame store.

10. The system as defined by claim 2, wherein said encoder is an RGBY encoder having red, green, blue and luminance inputs.

11. The system as defined by claim 10, wherein said encoder is an NTSC encoder having as its output an NTSC encoded signal.

* * * * *